United States Patent
Garvey et al.

(10) Patent No.: US 10,731,337 B2
(45) Date of Patent: Aug. 4, 2020

(54) BUILDING BOARD WITH ACOUSTICAL FOAM

(71) Applicant: CertainTeed Gypsum, Inc., Tampa, FL (US)

(72) Inventors: Thomas J. Garvey, Oakville (CA); Christopher K. Athari, St. Petersburg, FL (US); Pamela Shinkoda, Oakville (CA)

(73) Assignee: CertainTeed Gypsum, Inc., Malvern, PA (US)

( * ) Notice: Subject to any disclaimer, the term of this patent is extended or adjusted under 35 U.S.C. 154(b) by 0 days.

(21) Appl. No.: 16/031,444

(22) Filed: Jul. 10, 2018

(65) Prior Publication Data

US 2018/0320369 A1    Nov. 8, 2018

Related U.S. Application Data

(63) Continuation of application No. 13/837,109, filed on Mar. 15, 2013, now abandoned.

(51) Int. Cl.
   *E04B 1/86* (2006.01)
   *B32B 13/14* (2006.01)
   (Continued)

(52) U.S. Cl.
   CPC .............. *E04B 1/86* (2013.01); *B32B 3/266* (2013.01); *B32B 5/022* (2013.01); *B32B 7/02* (2013.01);
   (Continued)

(58) Field of Classification Search
   CPC .................................. E04B 1/86; B32B 13/14
   See application file for complete search history.

(56) References Cited

U.S. PATENT DOCUMENTS

| 2,806,811 A | 9/1957 | Von Hazmburg |
| 4,265,979 A | 5/1981 | Baehr et al. |

(Continued)

FOREIGN PATENT DOCUMENTS

| DE | 4446968 | 6/1995 |
| EP | 0282337 | 9/1988 |

(Continued)

OTHER PUBLICATIONS

Sheet, Merriam-Webster, retrieved May 16, 2016.
(Continued)

*Primary Examiner* — Daniel H Lee
(74) *Attorney, Agent, or Firm* — McDonnell Boehnen Hulbert & Berghoff LLP

(57) ABSTRACT

Disclosed is a building board construction that provides enhanced acoustical properties. In one possible embodiment, the board is a gypsum board with opposing facing sheets and an intermediate set gypsum core. An opened celled polymeric sheet is formed within the gypsum core and gives the resulting board enhanced sound absorption. In an alternative embodiment, individual pieces of polymeric foam are used in stead of the polymeric sheet. Also disclosed are various manufacturing methods whereby boards with enhanced acoustical properties can be formed in an continuous process. The various components of the present disclosure, and the manner in which they interrelate, are described in greater detail hereinafter.

13 Claims, 4 Drawing Sheets

(51) Int. Cl.
  *B32B 5/02*     (2006.01)
  *B32B 7/02*     (2019.01)
  *B32B 13/04*    (2006.01)
  *B32B 13/08*    (2006.01)
  *B32B 3/26*     (2006.01)
  *E04B 1/84*     (2006.01)

(52) U.S. Cl.
  CPC ............ *B32B 13/045* (2013.01); *B32B 13/08* (2013.01); *B32B 13/14* (2013.01); *B32B 2262/10* (2013.01); *B32B 2266/0285* (2013.01); *B32B 2266/06* (2013.01); *B32B 2307/102* (2013.01); *B32B 2419/00* (2013.01); *E04B 2001/8461* (2013.01); *Y10T 442/25* (2015.04)

(56) References Cited

U.S. PATENT DOCUMENTS

| | | | |
|---|---|---|---|
| 4,378,405 A | | 3/1983 | Pilgrim |
| 4,390,642 A | | 6/1983 | Smith |
| 5,060,291 A | | 10/1991 | Albertelli |
| 5,104,715 A | * | 4/1992 | Cruz ............ E04C 2/205 156/250 |
| 6,488,792 B2 | | 12/2002 | Mathieu |
| 6,941,720 B2 | | 9/2005 | DeFord et al. |
| 7,049,251 B2 | | 5/2006 | Porter |
| 7,686,902 B2 | | 3/2010 | Kimura et al. |
| 2005/0176833 A1 | | 8/2005 | Tay |
| 2010/0055431 A1 | * | 3/2010 | College ............ B28B 19/0092 428/218 |
| 2010/0143682 A1 | | 6/2010 | Shake |
| 2010/0273907 A1 | | 10/2010 | Frenzel |
| 2010/0331434 A1 | | 12/2010 | Shin |
| 2011/0297310 A1 | | 12/2011 | Hauber et al. |

FOREIGN PATENT DOCUMENTS

| | | | |
|---|---|---|---|
| EP | 0965701 | | 12/1999 |
| JP | S5251719 A | | 4/1977 |
| JP | S5355329 A | | 5/1978 |
| JP | 2005186410 A | | 7/2005 |
| KR | 20080027177 | | 3/2008 |
| KR | 20080027177 A | * | 3/2008 |
| WO | 9938663 | | 8/1999 |
| WO | 2000034595 | | 6/2000 |

OTHER PUBLICATIONS

Planar, Definition of., Merriam-Webster, http://www.merriam-webster.com/dictionary/planar, retrieved Nov. 17, 2016.

Parallel, Definition of., Merriam-Webster, http://www.merriam-webster.com/dictionary/parallel., retrieved Nov. 17, 2016.

* cited by examiner

BUILDING BOARD WITH ACOUSTICAL FOAM

CROSS-REFERENCE TO RELATED APPLICATIONS

This application is a continuation of U.S. patent Ser. No. 13/837,109, filed Mar. 15, 2013, which is hereby incorporated herein by reference in its entirety.

TECHNICAL FIELD

This disclosure relates to a building board construction. More specifically, the present invention relates to a building board with an acoustical foam.

BACKGROUND OF THE INVENTION

Building board, also known as wallboard, plasterboard, or drywall, is one of the most commonly used building components in the world today. Building board is frequently used within the interior of a dwelling, where it functions both as a finished wall covering and as a structural room partition. Building board can also be used on the exterior of a dwelling, where it serves as a sheathing to provide weather protection and insulation. Building board can also be used as an interior facing for other structures as well, such as stairwells, elevator shafts, and interior ducting.

One particularly popular form of building board is known as gypsum board. Gypsum board is constructed by depositing a layer of cementitious gypsum slurry between two opposing paper liners. Gypsum slurry is the semi-hydrous form of calcium sulfate and has many physical characteristics that make it suitable for use as a building component. For example, gypsum boards generally have a smooth external surface, a consistent thickness, and allow for the application of finishing enhancements, such as paint. Gypsum board is also desirable because it provides a degree of fire resistance and sound abatement.

An example of a paper-covered gypsum board is disclosed in U.S. Pat. No. 2,806,811 to Von Hazmburg. Von Hazmburg discloses a board that primarily consists of a thick gypsum core that is encased in a fibrous envelope consisting of both a manila sheet and a newsprint sheet. These sheet layers can be made from a conventional multi-cylinder paper making process.

Another popular form of building board is known as glass reinforced gypsum (GRG) board. An example of one such board is disclosed in U.S. Pat. No. 4,265,979 to Baehr et. al. Baehr discloses a building board constructed from opposing glass fiber mats with an intermediate gypsum core. This construction provides a hardened external surface and is an improvement over earlier paper faced boards.

Yet another type of gypsum board is disclosed in commonly owned U.S. Pat. No. 4,378,405 to Pilgrim. Pilgrim discloses a GRG board that is faced on one or both sides with a porous, nonwoven glass mat. The glass mat of Pilgrim is fully embedded into the slurry core. This is accomplished by vibrating the gypsum slurry to cause it to pass through the porous openings in the mat. Embedding the mat within the core as taught in Pilgrim results in a thin film of slurry being formed on the outer surface of the board. Building boards with this construction are referred to as embedded glass reinforced gypsum (EGRG) boards.

These various building board constructions offer many beneficial characteristics. However, none of these constructions provide for increased acoustical properties. As a result, these boards offer little, if any sound absorption or insulation, they act as a sound barrier. Sound absorption and insulation are especially important when the building board is used as a room partition or even as an exterior building component. Thus, there exists a need in the art for building boards with increased acoustical properties. More specifically, there is a need in the art for a board that absorbs sound waves. The present invention is aimed at achieving these and other objectives.

SUMMARY OF THE INVENTION

The building boards of the present disclosure have several important advantages. In particular, the disclosed building boards provide increase sound absorption without sacrificing any structural characteristics of the board.

A further advantage is realized by providing increased acoustical properties via the inclusion of a polymer sheet within the core of the building board.

Still yet another possible advantage of the present system is achieved by incorporating a polymer sheet via a continuous manufacturing method, thereby enabling the building board of the present disclosure to be manufactured quickly and inexpensively.

Another advantage of the present system is attained by including a series of sound absorbing polymeric cubes within the core of the building board.

Still yet another possible advantage of the present system is achieved by incorporating polymeric cubes or as a powdered material via a continuous manufacturing method, thereby enabling the building board of the present disclosure to be manufactured quickly and inexpensively.

A further advantage is recognized by incorporating sound absorbing materials into a gypsum building board via a continuous manufacturing method.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE DRAWINGS

The present disclosure relates to a building board with enhanced acoustical properties. In one possible embodiment, the board is a gypsum board with opposing facing sheets and an intermediate set gypsum core. An opened celled polymeric sheet is formed within the gypsum core and gives the resulting board enhanced sound absorption. In an alternative embodiment, individual pieces of polymeric foam are used instead of the polymeric sheet. Also disclosed are various manufacturing methods whereby boards with enhanced acoustical properties can be formed in a continuous process. The various components of the present disclosure, and the manner in which they interrelate, are described in greater detail hereinafter.

Figure 1:
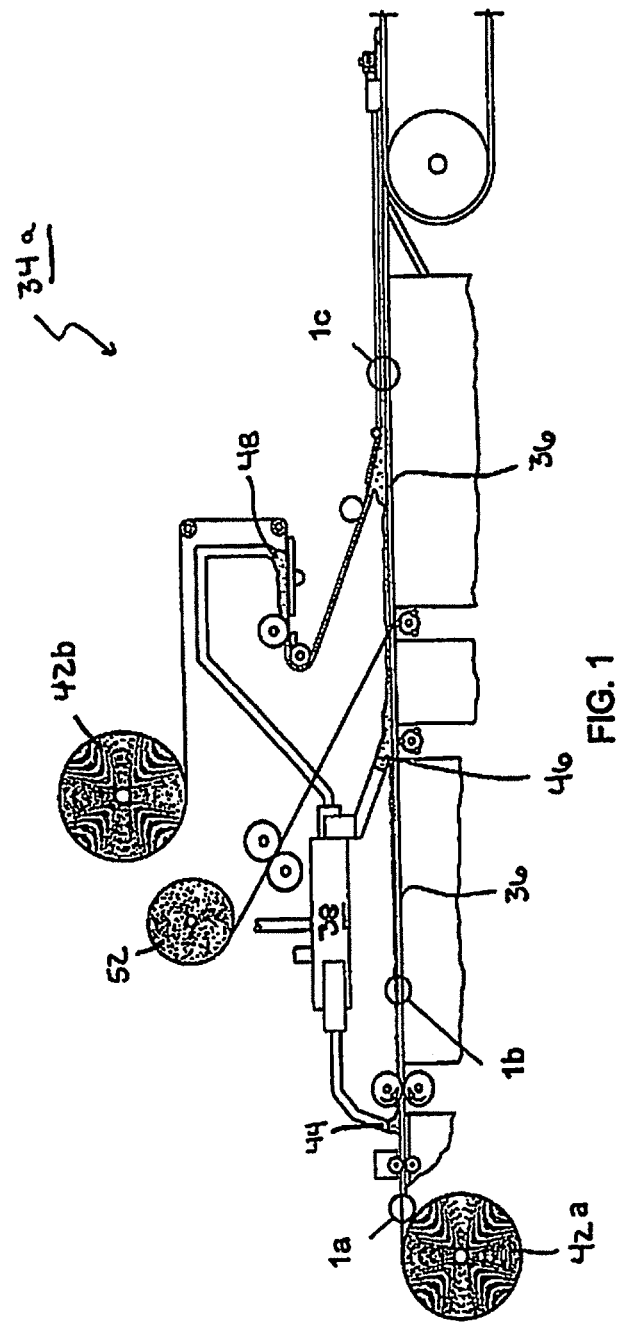
FIG. 1 is a diagram of one possible manufacturing process for the building boards of the present disclosure.
Figure 2:
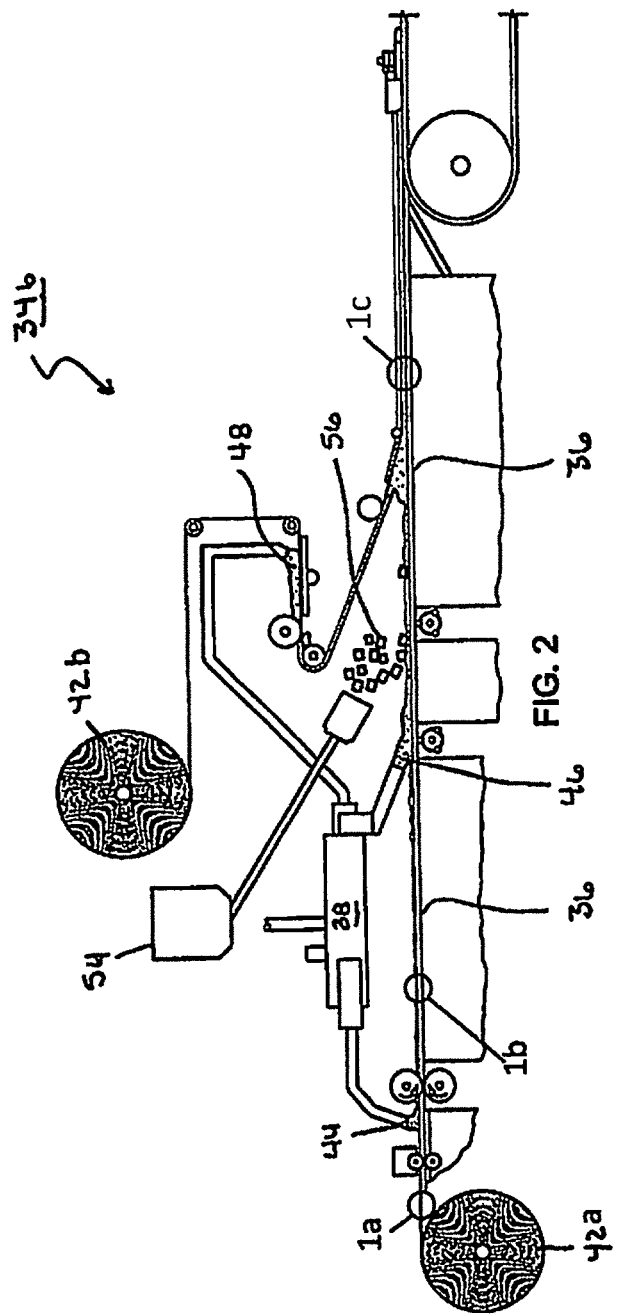
FIG. 2 is a diagram of another possible manufacturing process for the building boards of the present disclosure.
Figure 3:
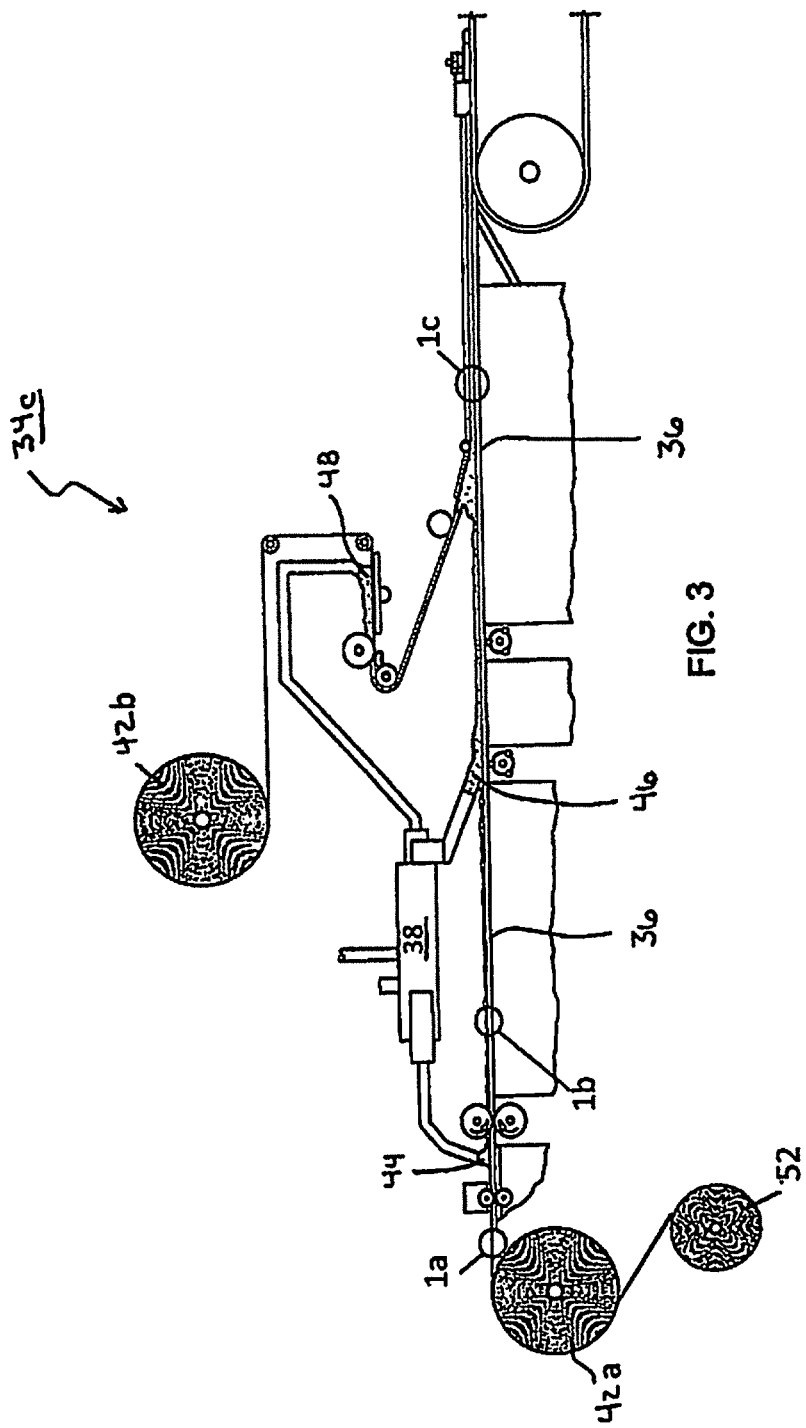
FIG. 3 is a diagram of another possible manufacturing process for the building boards of the present disclosure.
Figure 5:
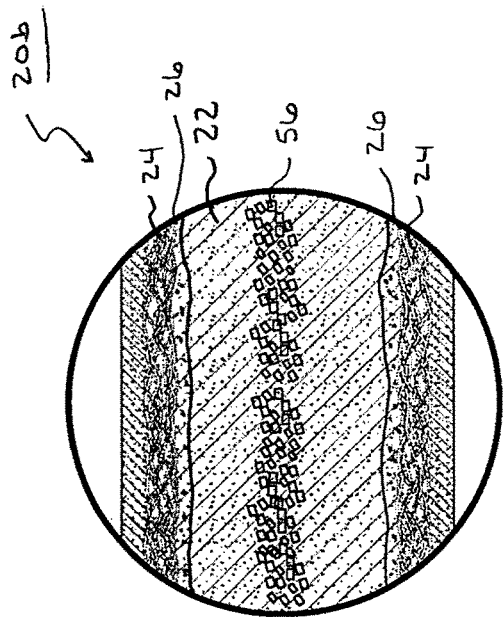
FIG. 5 is a cross sectional view of an alternative embodiment of the building board of the present disclosure.
Figure 6:
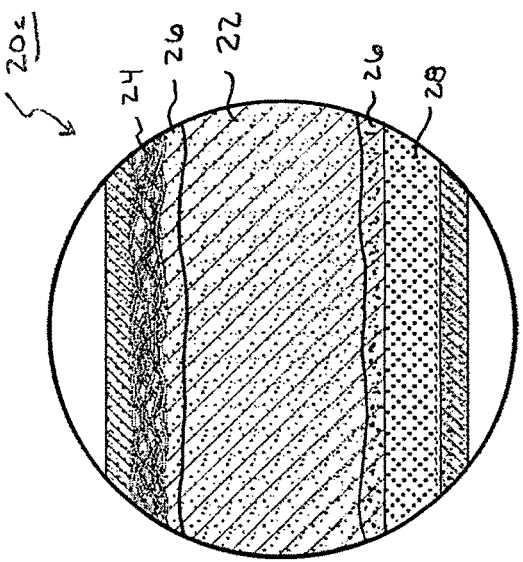
FIG. 6 is a cross sectional view of an alternative embodiment of the building board of the present disclosure.
Figure 4:
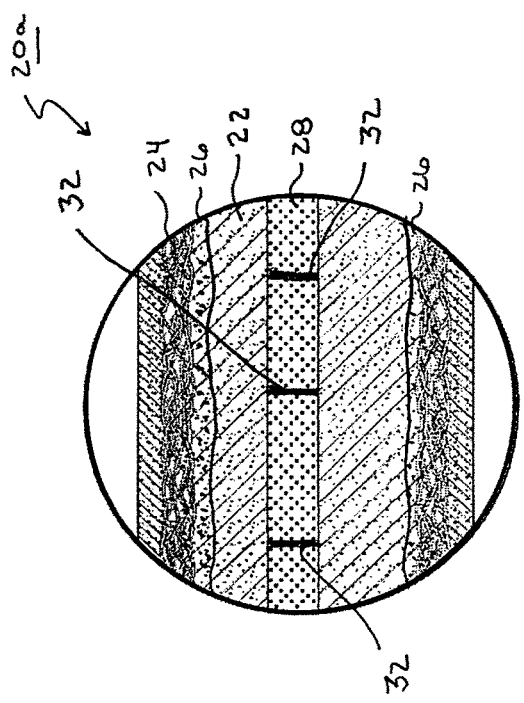
FIG. 4 is a cross sectional view of an embodiment of the building board of the present disclosure.

FIGS. 1-3 illustrate various production lines (34a, 34b, and 34c) for constructing the building boards of the present disclosure. FIGS. 4-6 are cross sectional views of various board constructions (20a, 20b, 20c) of the present disclosure. The boards of the present disclosure are generally a core layer 22 of a set gypsum core and opposing paper of fibrous sheets 24. In the particular embodiment illustrated in FIG. 4, board 20a has upper and lower mats 24 which are formed from a series of non-woven, randomly aligned inorganic fibers. These mats are preferably porous with interior and exterior faces. Paper facing sheets can also be used and are likewise represented by element 24.

With continuing reference to FIG. 4, upper and lower mats 24 are each coated with a layer of dense set slurry 26. Dense slurry 26 preferably penetrates the upper and lower mats 24. As a result the exterior surface of each mat 24 is substantially covered by set slurry. Core layer 22 of set gypsum extends fully between and bonds with the upper and lower dense slurry layers 26. In one embodiment, core slurry layer 22 has a density that is less than the density of the upper and lower dense slurry layers 26.

The enhanced acoustical properties are achieved via the inclusion of a polymer sheet 28 into core slurry layer 22. In the preferred embodiment, sheet 28 is formed from a melamine resin and is formed into an opened cell foam. Melamine resin is a thermoset polymer. A suitable foam is Basotect® which is manufactured and sold by BASF Corporation. Basotect® foam preferred because it provides a three-dimensional network of slender and easily shaped webs. Basotect® foam also gives the resulting board sound absorption, and chemical and fire resistance. However, the use of other polymer foams is also within the scope of the present disclosures. For a ½ inch thick building board, a polymer sheet 28 of ⅛ inch is preferred.

Sound waves entering the cells of the foam are subsequently attenuated and dissipated, thereby giving sheet 28 its sound absorbing characteristics. As such, it is important that the cells of the foam remain free to gypsum slurry during the formation of the board. Polymer sheet 28 is design to be positioned within, but not penetrated by, the core slurry layer 22. Because polymer sheet 28 does not absorb the slurry layer 22, and because it preferably extends over the majority of the width of board 20a, a series of apertures 32 must be formed through the thickness of sheet 28. Apertures 32 permit the slurry 22 to extend through sheet 28 to thereby fully integrate building panel 20a. In the absence of apertures 32, building panel 20a would be prone to separation along the boundary of sheet 28. In the event that polymer sheet 28 could absorb slurry layer 22, apertures could be eliminated 32. In the preferred embodiment, the thickness of core layer 22 is substantially larger than the thickness of polymer sheet 28.

FIG. 1 illustrates a gypsum board production line 34a that has been modified in accordance with the present disclosure. Production lines 34a includes a series of forming tables 36 for supporting building panel 20a during its formation. As is known in the art, the mats that form panel are under tension by way of a series of downstream belts. Once panel has been formed, it is passed to a series of board dryers. Dryers function in driving out excess moisture and causing the gypsum slurry to set. This results in the formation of a dried composite panel.

As further noted in FIG. 1, gypsum board 20a is formed from first and second fibrous mats 24 which a volume of gypsum slurry being deposited from a mixer 38. Paper mats can alternatively be used in place of fibrous mats. In either event, mats 24 are initially stored in large rolls 42 that are unwound in a continuous manufacturing method. A first large roll 42a is unwound onto forming table at location 1a. A dense slurry layer 26 can optionally be deposited over the first mat 24 after it is unrolled beneath a first mixer outlet 44. Rollers push the dense slurry layer through the mat at location 1b. Additional slurry is thereafter dispensed from mixer 38 at a second mixer outlet 46 to form core slurry layer 22. A second large roll 42b is ideally positioned downstream of first roll. A second mat 24 is unwound from this roll over top of the deposited gypsum core 22 to create sandwich or panel. The formed panel is noted at location 1c. Mixer 38 includes a third outlet 48 for supplying a dense slurry layer 26 over the second mat 24. The polymer sheet 28 is initially stored in a wound roll 52 and is dispensed immediately downstream of second mixer outlet 46. This positions sheet 28 in approximately the center of core 22.

An alternative production line 34b is disclosed in FIG. 2. Line 34b is the same in all respects to the production line of FIG. 1; however, the rolled polymer sheet 28 is replaced by a hopper 54 containing a plurality of polymer cubes 56 or a volume of a granulated polymer. In the preferred embodiment, cubes of approximately ½ inch are employed. Other shapes and sizes can also be used instead of ½ inch cubes. Basotect® foam can be used to produce polymer cubes 56. Cubes 56 are dispensed from a hopper 54 to a chute to deliver cubes 56 into core slurry layer 22. In still yet additional embodiments, the Basotect® foam is added to the slurry in a grated or granular form.

The resulting building board 20b has a cross section as illustrated in FIG. 5. Each of the polymer cubes 56 or granulated material includes an opened cell foam. Cubes 56 or granules are randomly distributed within slurry layer 22; however, slurry 22 does not penetrate the individual pieces or cubes 56. The composite board 20b is fully integrated as core layer 22 extends about the individual polymer cubes 56. In still yet another embodiment, the polymer foam can be grated to form very small bits of foam that agglomerate into a foam fluff. This foam fluff can then be distributed into slurry core 22.

A further embodiment of the production line 34c is depicted in FIG. 3. This embodiment uses a polymeric sheet 28, which may have the same construction as the sheet described in connection with FIG. 1. However, instead of sheet 28 being delivered into slurry core 22, it is secured to the lower mat 24 via an adhesive. More specifically, a roll 52 of the polymeric sheet is dispensed over top of mat 24 prior to the mat being delivered to the forming table 36. The cross sectional view of the resulting building board 20c is depicted in FIG. 6. As illustrated, sheet 28 is now oriented in facing relation with the first mat 24. It is also within the scope of the present invention to apply sheet 28 directly to one of the upper or lower dense slurry layers. This would avoid sheet 28 being secured to mat 24. Either of these embodiments may be used in connection with either of the previously described embodiments.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for making a composite, multi-layered building panel with enhanced acoustical properties, the panel comprising:
opposed upper and lower mats, the opposed upper and lower mats having interior and exterior faces;
a core layer of set gypsum having a thickness extending between the upper and lower mats; and
a polymer sheet positioned within the core layer such that the set gypsum of the core layer contacts both upper and lower surfaces of the polymer sheet, the polymer sheet having a thickness less than the thickness of the core layer, the polymer sheet having sound-absorbing characteristics;
the method comprising
providing the polymer sheet wound on a first roll;
providing the lower mat wound on a second roll;
continuously unwinding the lower mat from the second roll onto a forming table and moving the lower mat along the forming table in a first direction;
in a first zone continuously forming a core slurry layer on the lower mat and continuously unwinding the polymer sheet from the first roll thereof and continuously disposing the polymer sheet centrally within the core slurry layer;
providing the upper mat wound on a third roll;
continuously unwinding the upper mat from the third roll and disposing the upper mat on the core slurry layer having the polymer sheet disposed within; and
after disposing the upper mat thereon, causing the core slurry layer to set.

2. The method according to claim 1, wherein the core layer of set gypsum extends through the polymer sheet.

3. The method according to claim 1, wherein a series of apertures is formed through the thickness of the polymer sheet, the core layer extending through the apertures to allow the polymer sheet to bond to the core layer.

4. The method according to claim 1, wherein the polymer sheet is formed from a thermoset polymer.

5. The method according to claim 1, wherein the polymer sheet is formed from a melamine resin.

6. The method according to claim 5, wherein the polymer sheet has an open cell structure, the open cell structure enhancing the sound-absorbing characteristic of the building panel.

7. The method according to claim 1, wherein the polymer sheet has an open cell structure, the open cell structure enhancing the sound-absorbing characteristic of the building panel.

8. The method according to claim 1, wherein the composite building panel further comprises an upper layer of a set slurry coating the upper mat, and a lower layers of a set slurry coating the lower mat, wherein the upper and lower layers of set slurry have a greater density than the core layer, and wherein
the lower mat is provided with dense slurry layer formed thereon;
the core slurry layer continuously is formed on the dense slurry layer of the lower mat;
the upper mat is provided with a dense slurry layer formed thereon; and
the upper mat is continuously disposed on the core slurry layer with the dense slurry layer thereof against the core slurry layer.

9. The method according to claim 8, wherein the set gypsum of the core layer extends from the upper set slurry coating layer to the lower set slurry coating layer.

10. The method according to claim 8, wherein the upper and lower mats are porous mats formed from non-woven, randomly aligned inorganic fibers, wherein the upper and lower set slurry coating layers penetrate the upper and lower mats.

11. The method according to in claim 1, wherein the set gypsum of the core layer extends continuously from the upper mat to the lower mat.

12. The method according to claim 1, wherein the upper and lower mats are porous mats formed from non-woven, randomly aligned inorganic fibers.

13. The method according to claim 1, wherein the upper and lower mats are paper sheets.

* * * * *